United States Patent
Chan et al.

(10) Patent No.: US 9,316,160 B2
(45) Date of Patent: Apr. 19, 2016

(54) METHOD FOR OPERATING A THERMAL POWER PLANT

(71) Applicant: ALSTOM Technology Ltd, Baden (CH)

(72) Inventors: Kevin Chan, Birr (CH); Hongtao Li, Aarau (CH); Joerg Oesterheld, Meisterschwanden (CH)

(73) Assignee: ALSTOM Technology Ltd, Baden (CH)

( * ) Notice: Subject to any disclaimer, the term of this patent is extended or adjusted under 35 U.S.C. 154(b) by 433 days.

(21) Appl. No.: 14/024,781

(22) Filed: Sep. 12, 2013

(65) Prior Publication Data

US 2014/0069104 A1    Mar. 13, 2014

(30) Foreign Application Priority Data

Sep. 12, 2012   (EP) .................................... 12184075

(51) Int. Cl.
| F02D 29/06 | (2006.01) |
| H02P 9/04 | (2006.01) |
| F02C 9/16 | (2006.01) |
| F02C 9/00 | (2006.01) |

(Continued)

(52) U.S. Cl.
CPC ... F02C 9/16 (2013.01); F02C 9/00 (2013.01); F02C 9/28 (2013.01); H02J 3/24 (2013.01); F05D 2270/053 (2013.01); F05D 2270/061 (2013.01); F05D 2270/091 (2013.01)

(58) Field of Classification Search
USPC ...................................... 290/40 B, 44; 322/25
See application file for complete search history.

(56) References Cited

U.S. PATENT DOCUMENTS

| 3,999,115 A * | 12/1976 | South ..................... H02P 9/105 |
| | | 322/25 |
| 4,051,427 A * | 9/1977 | Kilgore ................... G08G 7/64 |
| | | 318/565 |

(Continued)

FOREIGN PATENT DOCUMENTS

| JP | 2010-148350 | 7/2010 |
| JP | 2012-500608 | 1/2012 |
| WO | 03/023224 | 3/2003 |

OTHER PUBLICATIONS

Pelletier, M.A.; Phethean, M.E.; Nutt, S. "Grid code requirements for artificial inertia control systems in the New Zealand power system", Power and Energy Society General Meeting, 2012 IEEE, vol. No. pp. 1,7, Jul. 22-26, 2012.

Primary Examiner — Pedro J Cuevas

(57) ABSTRACT

The invention relates to a method for operating a thermal power plant, which includes a gas turbine and a generator driven directly by the gas turbine by means of a shaft and being connected to an electrical grid having a grid frequency ($F_G$) via an electronic decoupling apparatus and a step-up transformer. A synthetic inertia response is achieved by said method includes the steps of:

sensing said grid frequency ($F_G$);
detecting if in case of an excursion of said grid frequency ($F_G$) additional inertial power is required or not;
if inertial power is required, calculating the magnitude and duration of the additional inertial power; and
releasing additional inertial power to said electrical grid in accordance with said calculations via said electronic decoupling apparatus.

8 Claims, 2 Drawing Sheets

(51) Int. Cl.
*F02C 9/28* (2006.01)
*H02J 3/24* (2006.01)
*F03D 9/00* (2006.01)
*H02P 11/00* (2006.01)

(56) References Cited

U.S. PATENT DOCUMENTS

| | | | | |
|---|---|---|---|---|
| 7,423,411 | B2 * | 9/2008 | Sihler | H02P 23/04 322/19 |
| 7,432,686 | B2 * | 10/2008 | Erdman | F03D 7/0224 290/40 R |
| 7,936,078 | B2 * | 5/2011 | Pavlak | F03D 9/002 290/44 |
| 8,018,082 | B2 * | 9/2011 | Scholte-Wassink | F03D 7/0224 290/44 |
| 8,896,261 | B2 * | 11/2014 | Bando | H02P 9/007 290/44 |
| 2008/0007121 | A1 * | 1/2008 | Erdman | F03D 7/0224 307/47 |
| 2010/0031667 | A1 | 2/2010 | Hoffmann et al. | |
| 2010/0032964 | A1 | 2/2010 | Hoffmann et al. | |
| 2010/0038907 | A1 * | 2/2010 | Hunt | E21B 41/0085 290/7 |
| 2010/0140939 | A1 * | 6/2010 | Scholte-Wassink | F03D 7/0224 290/44 |
| 2010/0230966 | A1 * | 9/2010 | Pavlak | F03D 9/002 290/44 |
| 2011/0031748 | A1 | 2/2011 | Arinaga et al. | |
| 2011/0074151 | A1 | 3/2011 | Burra et al. | |
| 2012/0104753 | A1 | 5/2012 | Nakashima et al. | |
| 2012/0104754 | A1 * | 5/2012 | Rudolf | F03D 7/0284 290/44 |
| 2012/0200087 | A1 * | 8/2012 | Schindele | F03D 7/0296 290/44 |
| 2013/0099565 | A1 * | 4/2013 | Sachs | F02J 3/46 307/25 |
| 2014/0091622 | A1 * | 4/2014 | Lucas | H02J 3/32 307/19 |
| 2015/0084563 | A1 * | 3/2015 | Lucas | H02P 6/165 318/400.29 |
| 2015/0318705 | A1 * | 11/2015 | Lucas | H02J 3/381 307/129 |

* cited by examiner

METHOD FOR OPERATING A THERMAL POWER PLANT

CROSS-REFERENCE TO RELATED APPLICATIONS

This application claims priority to European application 12184075.5 filed Sep. 12, 2012, the contents of which are hereby incorporated in its entirety.

TECHNICAL FIELD

The present invention relates to power plants. It refers to a method for operating a thermal power plant according to the preamble of claim 1.

BACKGROUND

According to FIG. 1 a thermal power plant 10 comprises a heavy-duty gas turbine 12, a generator 13 driven directly by the gas turbine by means of a shaft 14, and being connected to an electrical grid 17 via an electronic decoupling apparatus 15 and a conventional step-up transformer 16.

With the electronic decoupling apparatus 15, the frequency of the generator 13 may be different from the grid frequency $F_G$ of the electric grid 17 in order to improve the operational characteristics and service life of the gas turbine 12 and generator 13.

This decoupling from the grid frequency will result in this particular type of power plant 10 in being not able to inherently provide inertial power in response to a grid frequency disturbance event as in conventional power plant comprising synchronous generators. The impact of lack of inertial response may contribute to increase instability in the electrical grid and may not meet the grid requirements as specified in the transmission code.

Document US 2010/0031667 A1 discloses a method for operating a power station, with turbine shafting, that includes a gas turbine and a generator driven directly by the gas turbine and that generates alternating current with an operating frequency. The output of the generator is connected with an electrical grid with given grid frequency. An electronic decoupling apparatus or variable electronic gearbox is arranged between the generator and the grid, whereby the decoupling apparatus decouples the operating frequency from the grid frequency. Increased service life of the station and reduced emissions are achieved in that, when there are longer-lasting changes in the grid frequency, the mechanical or aerodynamic rotational speed of the gas turbine is kept constant and the output of the gas turbine is adjusted without a delay.

Document US 2010/0032964 A1 discloses a method for operating a power station with turbine shafting including a gas turbine and a generator that is driven directly by the gas turbine and that generates alternating current with an operating frequency. The output of the generator is connected to an electrical grid with a given grid frequency. An electronic decoupling apparatus or variable electronic gearbox is arranged between the generator and the grid. The decoupling apparatus decouples the operating frequency from the grid frequency. In the event of a temporary over-frequency or under-frequency event in the electrical grid, the mechanical rotational speed of the gas turbine is decreased more than the grid frequency during an under-frequency event of the electrical grid and is increased more than the grid frequency during an over-frequency event of the electrical grid.

In both cases, inertia does not play any role.

SUMMARY

It is an object of the present invention to provide a method for operating a thermal power plant, which overcomes the lack of inertial response issue and is able to meet the transmission code grid requirements.

This object is obtained by a method according to claim 1.

The method according to the invention is provided for a thermal power plant, which comprises a gas turbine and a generator driven directly by the gas turbine by means of a shaft and being connected to an electrical grid having a grid frequency via an electronic decoupling apparatus and a step-up transformer.

It comprises the steps of:
sensing said grid frequency;
detecting if in case of an excursion of said grid frequency additional inertial power is required or not;
if inertial power is required, calculating the magnitude and duration of the additional inertial power; and
releasing additional inertial power to said electrical grid in accordance with said calculations via said electronic decoupling apparatus.

According to an embodiment of the invention the detecting step is based on a predefined rate of change of said grid frequency and a predetermined frequency threshold of said grid frequency.

According to another embodiment of the invention said electronic decoupling apparatus has a short-term capacity, and within said calculating step said short-term capacity of the electronic decoupling apparatus and/or the initial operating conditions of the power plant at start of said grid frequency excursion are considered.

According to a further embodiment of the invention for said power releasing step set points are given to said electronic decoupling apparatus to release an active inertial power and also a reactive power to said electrical grid.

Specifically, an upper and lower threshold for said grid frequency or turbine speed of said gas turbine is defined, whereby said additional inertial power is released for said grid frequency or turbine speed being between said upper and lower thresholds.

More specifically, the release of additional inertial power is stopped as soon as the said thresholds are exceeded in order to avoid over-speed or under-speed of said gas turbine.

Even more specifically, after stopping the release of said additional inertial power the gas turbine turns back to a rated speed or to a pre-defined over-speed, and provides base power or more.

According to another embodiment of the invention said electronic decoupling apparatus is a matrix converter without a DC link.

BRIEF DESCRIPTION OF THE DRAWINGS

The present invention is now to be explained more closely by means of different embodiments and with reference to the attached drawings.

DETAILED DESCRIPTION

Figure 1:
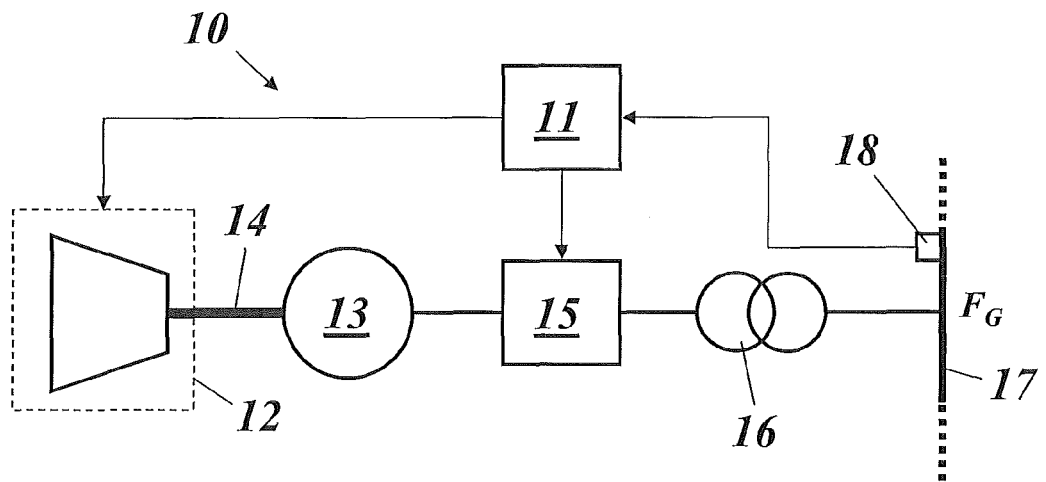
FIG. 1 shows a schematic diagram of a power plant with a gas turbine and an electronic decoupling apparatus, which can be used for the method according to the invention.

In FIG. 1, a thermal power plant 10 with a gas turbine 12, an electronic decoupling apparatus 15 and a generator step-up transformer 16 is illustrated similar to a configuration that is suitable for executing the method according to this invention.

The power plant 10 comprises a generator 13 coupled directly to the gas turbine 12 (shaft 14). Hence, the generator 13 rotates at the same rotational speed as the gas turbine 12. However, between the output of the generator 13 and the electrical grid 17, there is an electronic decoupling apparatus 15 that decouples generator electrical operating frequency from the grid electrical operating frequency $F_G$. The electronic decoupling apparatus 15 is typically, but not necessarily, a matrix converter without a DC link. The configuration and function of such a matrix converter has for example been described in document EP 1 199 794 A2.

The decoupling of the generator electrical frequency from the grid electrical frequency $F_G$ results in this type of power plant being not able to inherently provide inertial power in response to a grid frequency disturbance event as in conventional power plant. The impact of lack of inertial response may contribute to increase instability in the electrical grid and may not meet the grid requirements as specified in the transmission code.

Figure 2:
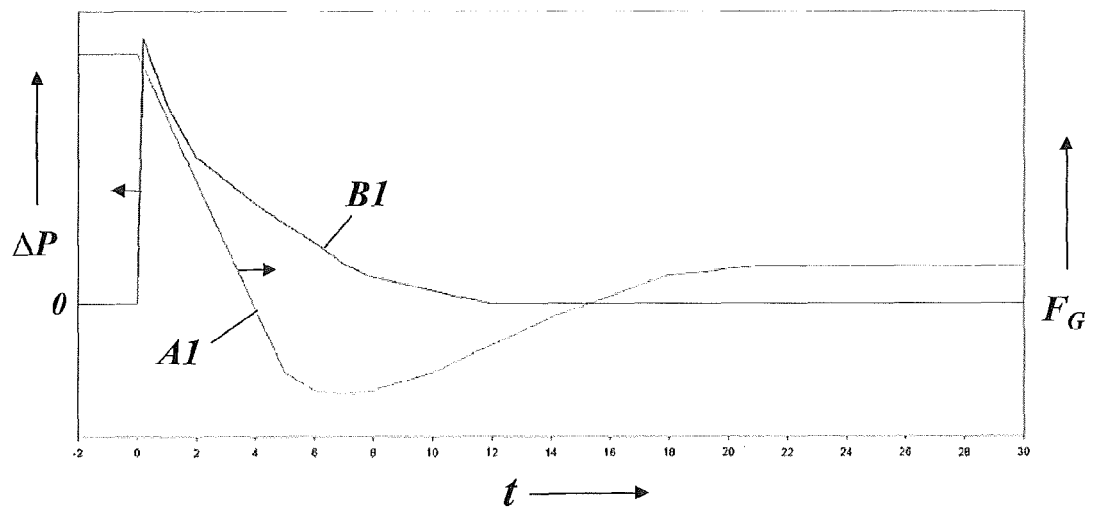
FIG. 2 shows the additional inertial power ΔP (curve B1) as a result of a change in electrical grid frequency $F_G$ (curve A1) for a typical conventional thermal power plant with inherent inertial response.

In FIG. 2, the additional inertial power ΔP as a result of a change in electrical grid frequency $F_G$ for a typical conventional thermal power plant with inherent inertial response is shown. When the grid frequency $F_G$ sharply decreases (curve A1, with a constant slope) at t=0, the (synchronous) generator due to the inherent inertia immediately supplies a substantial amount of additional inertial power ΔP (curve B1), which decays gradually. This inertial power ΔP will contribute to arresting and reversing the decrease in grid frequency $F_G$ in a given time span dependent on the prevailing power system state.

Figure 3:
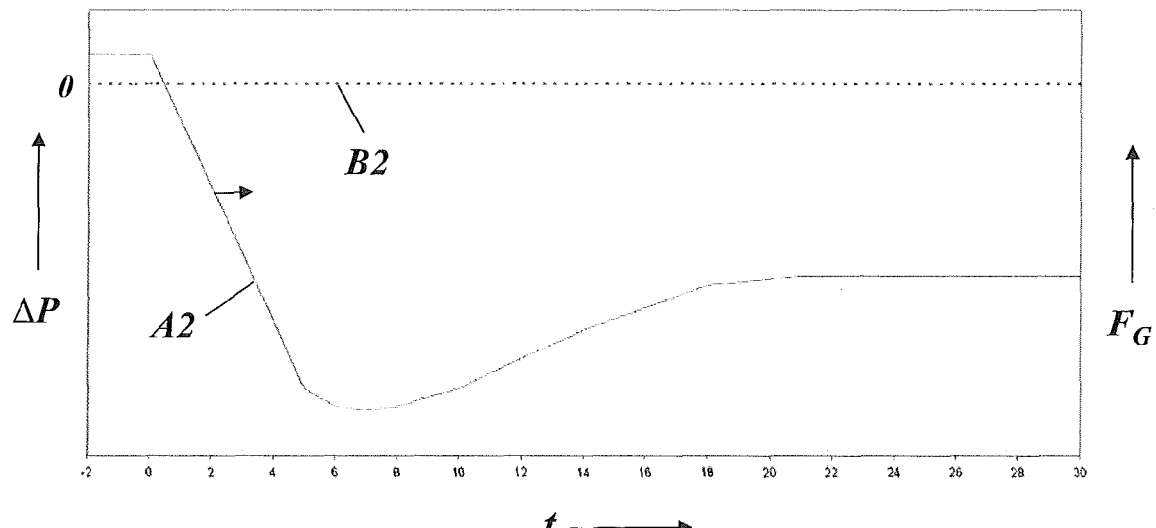
FIG. 3 shows the additional inertial power ΔP (curve B2) as a result of a change in electrical grid frequency $F_G$ (curve A2) for a non-conventional power plant according to FIG. 1 with no inertial response.

In FIG. 3, the additional inertial power (curve B2) as a result of a change in electrical grid frequency (curve A2) similar to FIG. 2 for a non-conventional power plant according to FIG. 1 with no inertial response is shown by the dotted curve.

The method of operation described in the present invention, provides a solution to the lack of inertial response for the non-conventional type of thermal power plant 10 according to FIG. 1. This method uses the concept of synthetic inertia to provide additional inertial power during major grid frequency deviations to support grid stability. Within this method, grid frequency $F_G$ is monitored or sensed by suitable sensing means 18, which are connected to a control unit 11. The control unit 11 controls the operation of the electronic decoupling apparatus 15 and the gas turbine 12.

This method comprises the following stages or steps:
Detection phase—It is automatically detected, if inertial power is required or not. The detection is based on a predefined rate of change of grid frequency and a frequency threshold.

Inertial power determination phase—During the determination phase, the magnitude and duration of the necessary additional inertial power ΔP will be calculated. Plant parameters that need to be considered are the short-term capacity of the electronic decoupling apparatus 15 and the initial operating conditions of the power plant 10 at start of the grid frequency excursion (t=0 in FIG. 2-4).

Inertial power release phase—The electronic decoupling apparatus 15 is given the set points to release the active inertial power and also the reactive power to the electrical grid 17.

Figure 4:
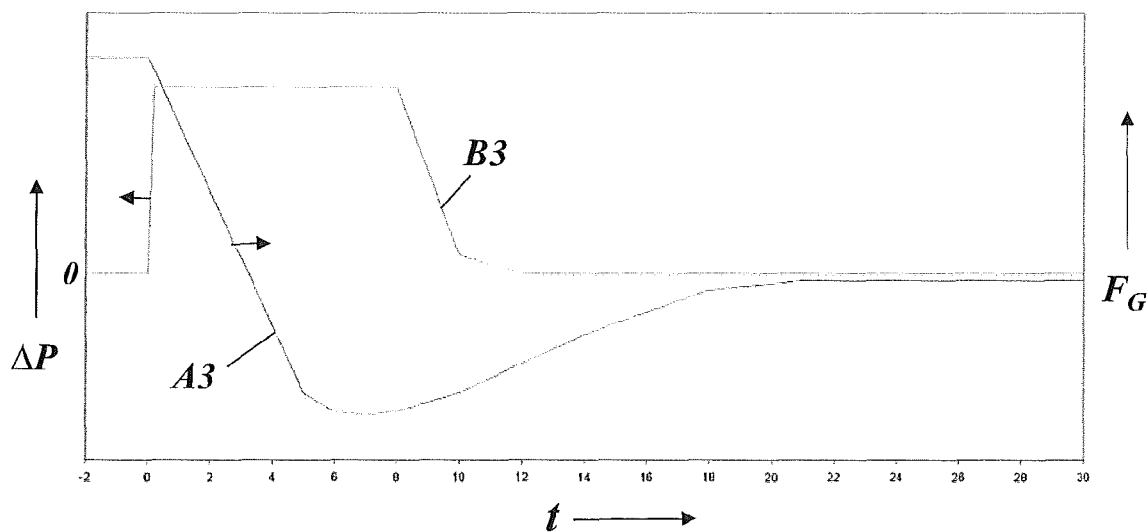
FIG. 4 shows the additional inertial power ΔP (curve B3) as a result of a change in electrical grid frequency $F_G$ (curve A3) for a non-conventional power plant according to FIG. 1, when operating in inertial response mode according to an embodiment of the invention.

In FIG. 4, an example for the additional inertial power ΔP as a result of a change in electrical grid frequency $F_G$ is for the non-conventional power plant 10 of FIG. 1 is shown when operating in inertial response mode according to the method described.

Due to the controllability of the inertial power the inventive method allows additionally to define upper and lower thresholds for grid frequency or turbine speed. Between the thresholds the inertial response is provided as described. But as soon as the critical thresholds are exceeded, the plant could stop the delivery of inertial power in order to avoid over-speed or under-speed of the turbine.

Conventional plants would be tripped by protection functions and consequently disconnect from the grid, which can potentially contribute to a black-out. The non-conventional thermal power plant described in the present invention can be kept connected in a wider grid frequency range and deliver as much power as allowed by the equipment at the given frequency and speed.

After stopping the inertial response the turbine can turn back to rated speed or even to a pre-defined over-speed and can provide base power or more, where a conventional thermal power plant would be already disconnected. This gives the grid operator more time to balance the power in island grids supplied by this kind of power plants and consequently to avoid a total black-out.

Thus, the advantages of this new method of operation are:
Additional inertial power ΔP is only provided for major frequency deviations. Minor frequency variations would not activate the inertial response operation mode, which helps to improve service life of the plant.
The magnitude and duration of additional inertial power ΔP are controllable based on the electronic decoupling apparatus 15 to meet the requirements defined in the grid transmission codes.
By dimensioning the converter (electronic decoupling apparatus 15) appropriately and with the flexibility of controlling the magnitude and duration of inertia power, it is possible to provide inertial response as an ancillary service to the transmission grid.
The thermal power plant operated according the described method can operate outside the protection limits of conventional plants and can deliver significant amount of power.

The invention claimed is:
1. A method for operating a thermal power plant, which includes a gas turbine and a generator driven directly by the gas turbine by means of a shaft and being connected to an electrical grid having a grid frequency ($F_G$) via an electronic decoupling apparatus and a step-up transformer, said method comprising the steps of:
sensing said grid frequency ($F_G$);
detecting if in case of an excursion of said grid frequency ($F_G$) additional inertial power (ΔP) is required or not;

if inertial power (ΔP) is required, calculating the magnitude and duration of the additional inertial power (ΔP); and releasing additional inertial power (ΔP) to said electrical grid in accordance with said calculations via said electronic decoupling apparatus.

2. The method according to claim 1, wherein the detecting step is based on a predefined rate of change of said grid frequency ($F_G$) and a predetermined frequency threshold of said grid frequency ($F_G$).

3. The method according to claim 1, wherein said electronic decoupling apparatus has a short-term capacity, and within said calculating step said short-term capacity of the electronic decoupling apparatus and/or the initial operating conditions of the power plant at start of said grid frequency excursion are considered.

4. The method according to claim 1, wherein for said power releasing step set points are given to said electronic decoupling apparatus to release an active inertial power and also a reactive power to said electrical grid.

5. The method according to claim 1 wherein an upper and lower threshold for said grid frequency ($F_G$) or turbine speed of said gas turbine is defined, and that said additional inertial power (ΔP) is released for said grid frequency ($F_G$) or turbine speed being between said upper and lower thresholds.

6. The method according to claim 5, wherein the release of additional inertial power (ΔP) is stopped as soon as the said thresholds are exceeded in order to avoid over-speed or under-speed of said gas turbine.

7. The method according to claim 6, wherein after stopping the release of said additional inertial power (ΔP) the gas turbine turns back to a rated speed or to a pre-defined over-speed, and provides base power or more.

8. The method according to claim 1 wherein said electronic decoupling apparatus is a matrix converter without a DC link.

* * * * *